(12) United States Patent
Beckman et al.

(10) Patent No.: US 10,079,729 B2
(45) Date of Patent: Sep. 18, 2018

(54) ADAPTIVE STORAGE-AWARE MULTIPATH MANAGEMENT

(71) Applicant: INTERNATIONAL BUSINESS MACHINES CORPORATION, Armonk, NY (US)

(72) Inventors: Isaac Beckman, Lehavim (IL); Vladislav Drouker, Holon (IL); Alon Marx, Matan (IL); Yossi Yamin, Gan Yavne (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/754,106

(22) Filed: Jun. 29, 2015

(65) Prior Publication Data

US 2016/0378342 A1    Dec. 29, 2016

(51) Int. Cl.
| | | |
|---|---|---|
| *G06F 3/06* | (2006.01) |
| *H04L 12/24* | (2006.01) |
| *H04L 29/08* | (2006.01) |
| *H04L 12/751* | (2013.01) |
| *H04L 12/46* | (2006.01) |

(52) U.S. Cl.
CPC .............. *H04L 41/12* (2013.01); *G06F 3/061* (2013.01); *G06F 3/067* (2013.01); *G06F 3/0635* (2013.01); *H04L 12/4625* (2013.01); *H04L 45/02* (2013.01); *H04L 67/1097* (2013.01)

(58) Field of Classification Search
CPC ...... G06F 3/0604; G06F 3/067; G06F 3/0635; H04L 45/02; H04L 41/12; H04L 67/1097
See application file for complete search history.

(56) References Cited

U.S. PATENT DOCUMENTS

| | | | |
|---|---|---|---|
| 7,275,103 B1 * | 9/2007 | Thrasher .................. | H04L 45/22 709/223 |
| 8,443,137 B2 | 5/2013 | Yochai et al. | |
| 8,700,811 B2 | 4/2014 | Oshins et al. | |
| 8,819,374 B1 | 8/2014 | Don et al. | |
| 8,843,624 B2 | 9/2014 | Britsch et al. | |
| 8,972,656 B1 | 3/2015 | Armangau et al. | |
| 2010/0049919 A1 | 2/2010 | Winokur et al. | |
| 2011/0231541 A1 * | 9/2011 | Murthy ................. | G06F 3/0613 709/224 |
| 2012/0096287 A1 * | 4/2012 | Kamath ................ | G06F 1/3203 713/300 |
| 2013/0007410 A1 | 1/2013 | Kopylovitz et al. | |
| 2014/0040212 A1 | 2/2014 | Yochai et al. | |
| 2014/0365622 A1 * | 12/2014 | Iyengar ............... | H04L 67/1097 709/220 |

(Continued)

OTHER PUBLICATIONS

Device-mapper Resource Page, 2 pages, retrieved Jun. 2, 2015 from https://www.sourceware.org/dm/.

(Continued)

*Primary Examiner* — Arpan P Savla
(74) *Attorney, Agent, or Firm* — Griffiths & Seaton PLLC

(57) ABSTRACT

Various embodiments for multipath management in a storage grid, by a processor device, are provided. In one embodiment, a method comprises continuously monitoring and comparing current data path devices against the current storage structure, and changing routing decision configurations when it is detected there is a more efficient data path.

15 Claims, 5 Drawing Sheets

(56) References Cited

U.S. PATENT DOCUMENTS

| | | | |
|---|---|---|---|
| 2015/0040128 A1 | 2/2015 | Garza et al. | |
| 2015/0071123 A1* | 3/2015 | Sabaa | H04L 67/1004 370/255 |
| 2015/0095445 A1 | 4/2015 | Thankappan et al. | |
| 2015/0124812 A1* | 5/2015 | Agarwal | H04L 45/24 370/392 |
| 2016/0239239 A1* | 8/2016 | Tin | G06F 3/0647 |
| 2016/0357457 A1* | 12/2016 | Chien | G06F 3/0613 |

OTHER PUBLICATIONS

Enterprise Volume Management System, 2 pages, retrieved Jun. 2, 2015 from http://evms.sourceforge.net/.

LVM2 Resource Page, 2 pages, retrieved Jun. 2, 2015 from https://www.sourceware.org/lvm2/.

List of IBM Patents or Patent Applications Treated as Related dated Dec. 29, 2016 (2 pages).

Bhanage et al., "Storage-Aware Routing Protocol for the MobilityFirst Network Architecture," 11th European Wireless Conference 2011—Sustainable Wireless Technologies, 2011 (8 pages).

Cozette et al., "READ2: Put disks at network level," Proceedings of the 3rd IEEE/ACM International Symposium on Cluster Computing and the Grid, 2003 (7 pages).

Internet Society Requests for Comment et al., "Node-specific Client Identifiers for Dynamic Host Configuration Protocol Version Four (DHCPv4) (RFC4361)," an IP.com Prior Art Database Technical Disclosure, IP.com No. IPCOM000133794D, Feb. 1, 2006 (14 pages).

Sher Decusatis et al., "Communication within Clouds: Open Standards and Proprietary Protocols for Data Center Networking," IEEE Communications Magazine, Sep. 2012 (8 pages).

\* cited by examiner

ADAPTIVE STORAGE-AWARE MULTIPATH MANAGEMENT

BACKGROUND OF THE INVENTION

Field of the Invention

The present invention relates in general to computing systems, and more particularly, to various embodiments for routing data in complex computer networks.

Description of the Related Art

Today with modern technology, large volumes of data are storable on disk drives; these drives can exist as a solo entity, or as part of a broader make up within a larger storage environment, for example, as part of a Storage Area Network (SAN), or Software Defined Storage (SDS) systems, such as a Virtual Storage Area Network (VSAN). As the sheer volume of data in today's information-based society continues to increase, so too does the demands placed on communications and data processing infrastructures that serve to manipulate, transfer, and otherwise handle this data.

SUMMARY OF THE INVENTION

Various embodiments for multipath management in a storage grid, by a processor device, are provided. In one embodiment, a method comprises continuously monitoring and comparing current data path devices against the current storage structure and connectivity thereof, and changing routing decision configurations when it is detected there is a more efficient data path.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
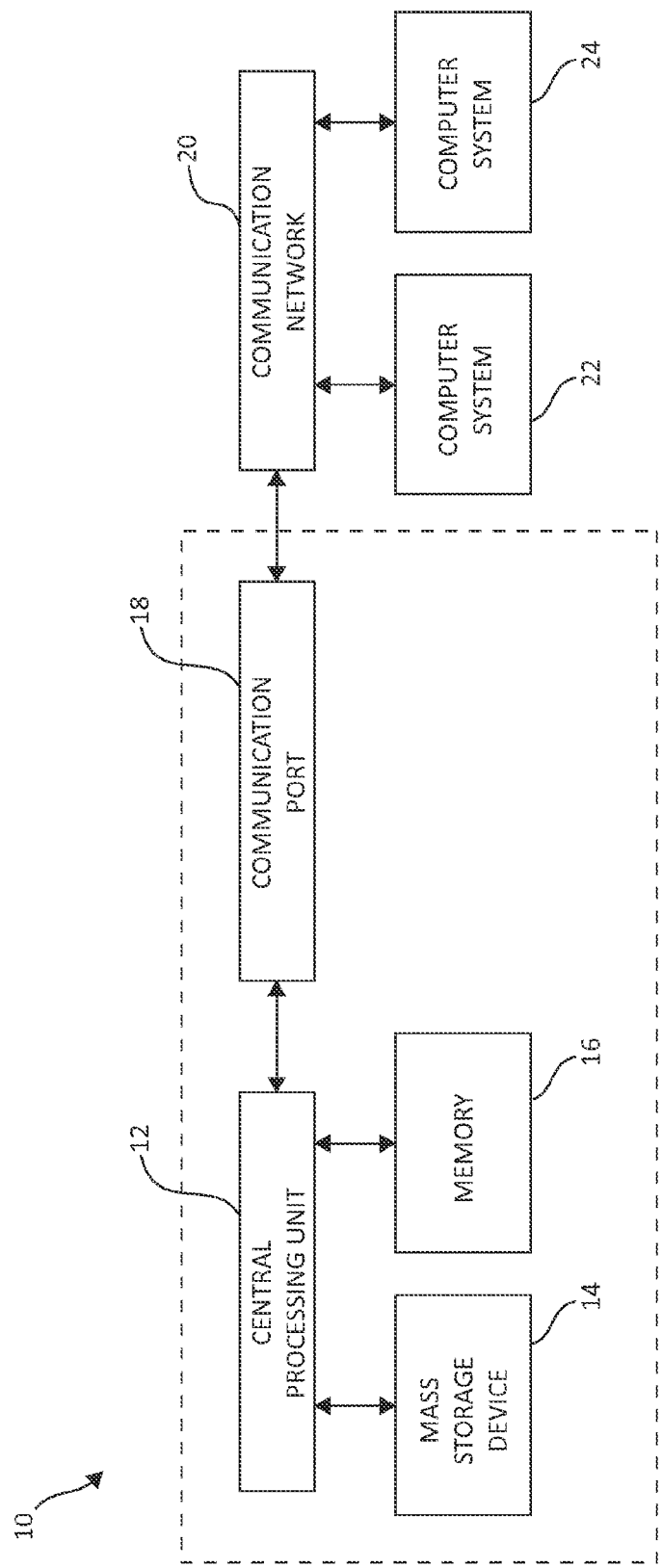
FIG. 1 illustrates a block diagram showing an exemplary hardware structure for effecting multipath data management, in which aspects of the present invention may be realized.

Described embodiments, and illustrative Figures of a method for data multipath management are to follow. In the interest of clarity, not all features of an actual implementation are described in this Specification. It will of course be appreciated by the skilled artisan, that in the development of any such actual embodiment, numerous implementation-specific decisions must be made to achieve the developers specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Complex Storage Area Network (SAN) or Virtual Storage Area Network (VSAN) configurations enable large numbers of computing components such as servers to access common storage via interconnection switches and cabling. The availability, integrity and recovery of these interconnections is critical to the reliable operations of the systems. Networks are often implemented with redundant routes, in conjunction with server multipath drivers allowing for failing commands to be recovered down alternate paths and avoiding outages and individual path failures.

Modern storage arrays use a distributed architecture and provide several interfaces for interconnection. Multipathing enables a host server to connect to a storage array through multiple Input/Output (I/O) paths, in order to increase bandwidth, provide stability, and path redundancy for High Availability (HA) of the stored data.

Multipath solutions are generally not made aware of the underlying storage architecture, and as such do not utilize this knowledge to improve I/O performance. Previously, this has been addressed only by drivers that map a Logical Block Address (LBA) to a specific path to improve performance. However, mapping an LBA to a specific path assumes a static structure of the grid-oriented storage and does not assume nor reflect changes in the grid architecture. The addition or removal of I/O paths, for example, is a change that happens frequently in modern Software Defined Storage arrays (SDS), which are characterized by a distributed, scaled-out architecture, and are flexible by design nature.

In view of the foregoing, the mechanisms of the illustrated embodiments provide various solutions to the previous challenges for data multipath management within a grid-storage environment. These mechanisms include such functionality as dynamically monitoring changes and keeping various components updated with current storage structure connectivity, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
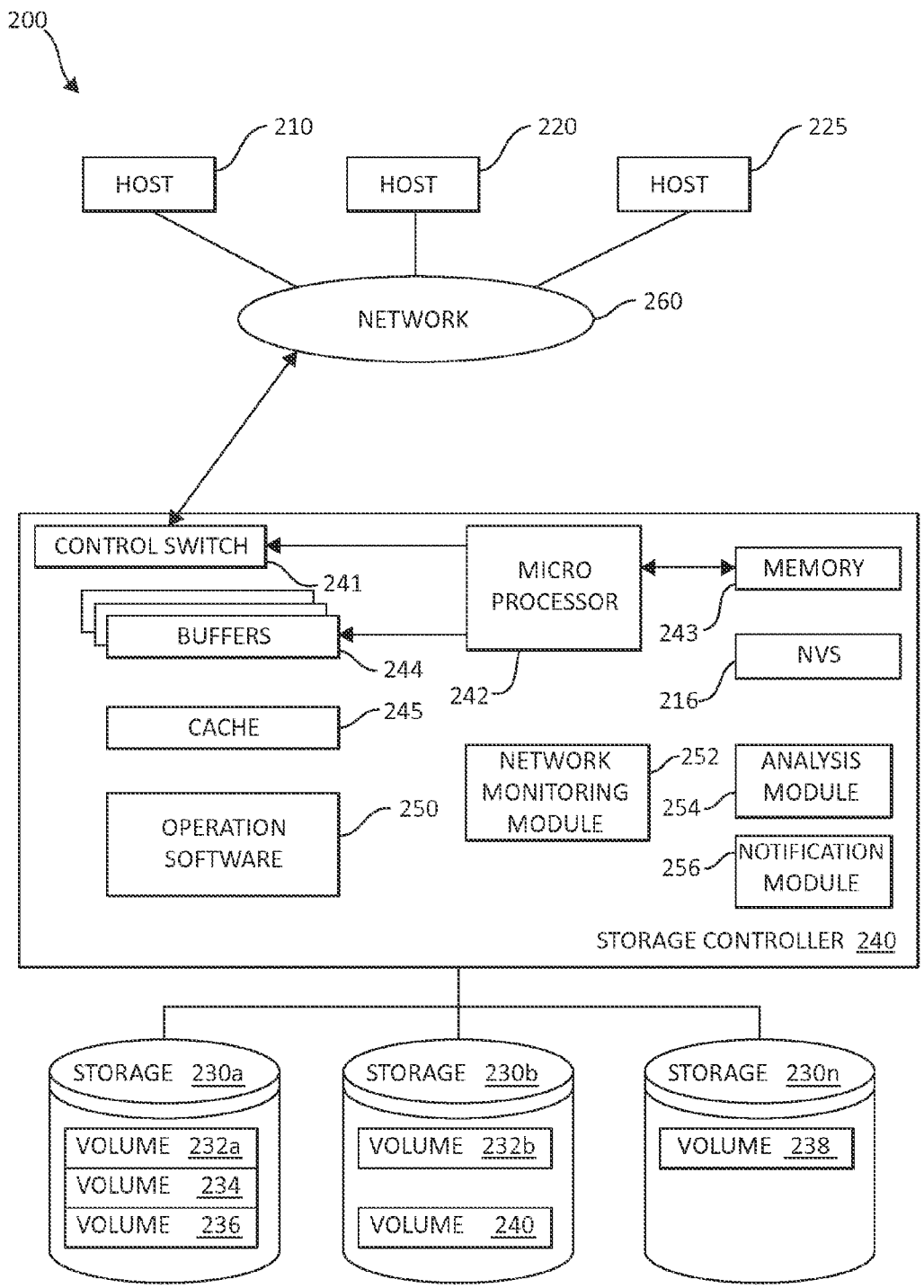
FIG. 2 illustrates an additional block diagram of an additional exemplary hardware structure, specifically portions of a complex SAN, again, in which aspects of the present invention may be realized.

FIG. 2 is an exemplary block diagram 200 showing a hardware structure of a data storage and management system (specifically, portions of a SAN 200) that may be used in the overall context of performing multipath I/O management in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as a hard disk, magnetic tape, solid-state flash memory, or other non-volatile memory or any combination threreof. Additionally, Storage 230 may be physically comprised of one or more storage devices such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, a network monitoring module 242, an analysis module 254, and a notification module 256. The operation software 250, network monitoring module 242, analysis module 254, and notification module 256 may work in conjunction with each and every component of the storage controller 240, the hosts 210, 220, 225, and storage devices 230. The operation software 250, network monitoring module 242, analysis module 254, and notification module 256 may be structurally one complete module or may be associated and/or included with other individual modules. The operation software 250, network monitoring module 242, analysis module 254, and notification module 256 may also be located in the cache 245 or other components of portion 200.

The operation software 250, network monitoring module 242, analysis module 254, and notification module 256 may individually and/or collectively perform various aspects of the present invention as will be further described. For example, the operation software 250 may contain executable code for performing network test and evaluation functionality. The network monitoring module 252 may implement one or more monitoring processes. The network monitoring module 252 may monitor individual SAN components and/or data transmission between SAN components. For example, network monitoring module 252 may monitor data exchanges across particular data communication paths. The analysis module 254 may be used to configure management techniques for data multipath management as will be further described. Finally, the notification module 256 may send notification messages to other components in the portion 200 or elsewhere about various network status or multipath management actions taken.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, and other components in the storage controller 240. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like.

The mechanisms of the illustrated embodiments, among other functionality, provide the ability to adapt I/O paths dynamically, by tracking changes in the storage structure and its connectivity. In grid-oriented storage, routing data to the shortest and most optimal path (which may change frequently), significantly affects overall performance. The illustrated embodiments provide a Storage-Aware Multipath Management (SAMM) system, the functionality of which continuously updates the storage-aware multipath with each change regarding storage structure connectivity, thus enabling optimal routing decisions for each data delivery.

In one embodiment, for example, whenever the storage structure system is built onto and scaled-out, the information about the new structural environment may be handed to a storage-aware multipathing driver, which may utilize information regarding the new structural environment to calculate optimal paths for data, resulting in an improved I/O performance and High Availability (HA) of the storage structure.

To easily adapt to routing changes between a host and grid storage environment, SAMM continuously monitors and tracks storage changes, and maintains a set of data paths that are optimal and compatible with the grid environment. SAMM acts as middle ware between a user's application and operating system, and continuously and simultaneously handles two action paths. First, SAMM monitors and tracks I/O and data path handling, in which the required components within the operating system are handled to ensure a successful and efficient Read/Write of data blocks transacting between the storage environment. Second, SAMM handles the required components to create and maintain the devices within the data path that reflect the current status of the grid storage structure and connectivity.

Figure 3:
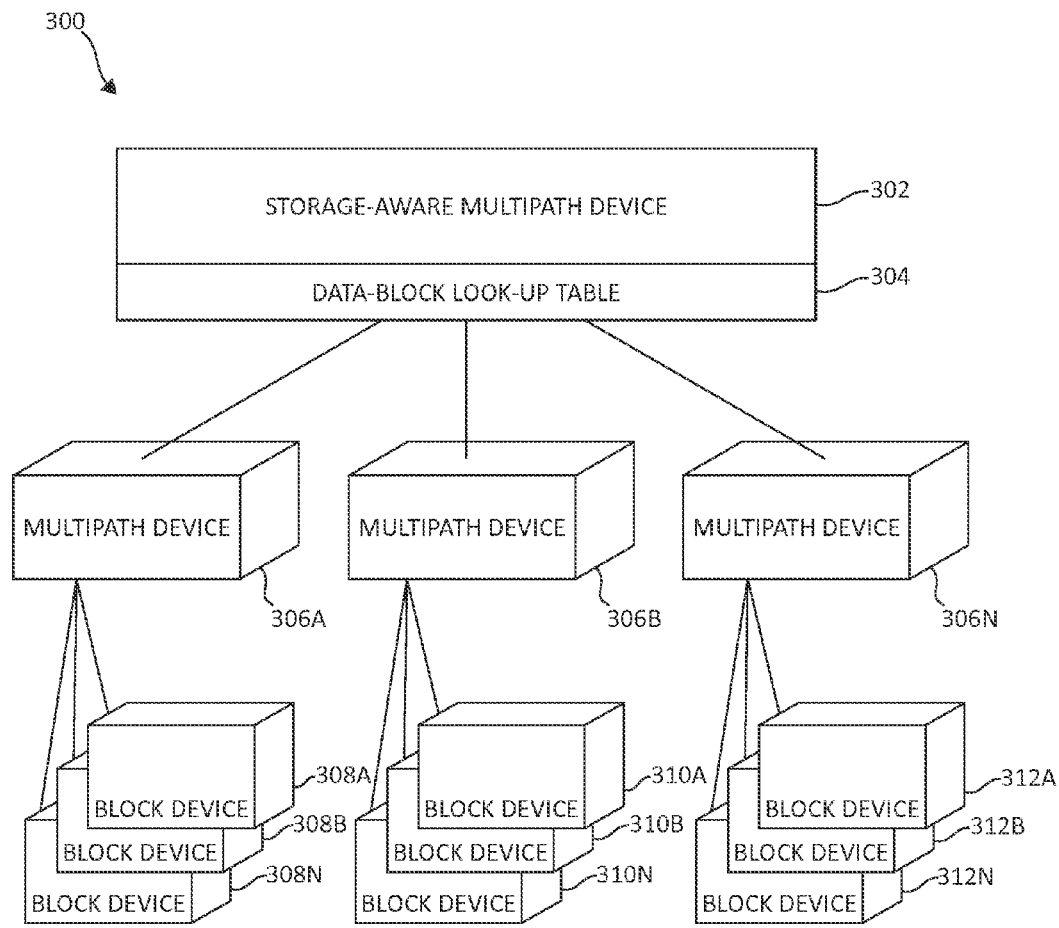
FIG. 3 illustrates a block diagram for multipath management, commonly implemented in software, in which aspects of the present invention may be realized.

Continuing to FIG. 3, a block diagram of a data path model 300 is illustrated. Within the model, there are three levels representing the data path. Level one is a block device level, with block devices 308a, 308b, 308n, 310a, 310b, 310n, 312a, 312b, and 312n. For each possible physical path that may be used to read or write data transacting between the storage structure, there is a block representing it, such as aforementioned block devices 308a, 308b, 308n, 310a, 310b, 310n, 312a, 312b, and 312n.

Level two is a multipath device level, illustrated by multipath devices 306a, 306b, and 306n. The multipath device level is a fault-tolerance level, which aggregates several physical paths to a grid node of the storage grid, and a level-one device represents each path. The multipath device level is able to leverage redundant physical paths to provide performance-enhancing features such as dynamic-load balancing, traffic shaping, and automatic path management for HA.

Level three is a storage-aware device level, illustrated by storage-aware device 302. The storage-aware device level aggregates and manages multiple multipath devices 306a, 306b, and 306n, using information regarding current storage structure and connectivity. This information is maintained for calculating the shortest or most optimal path for each data block transacting to/from storage. The storage-aware device 302 incorporates a data-block lookup table 304 that maintains the routing decision for each data-block it serves.

Figure 4:
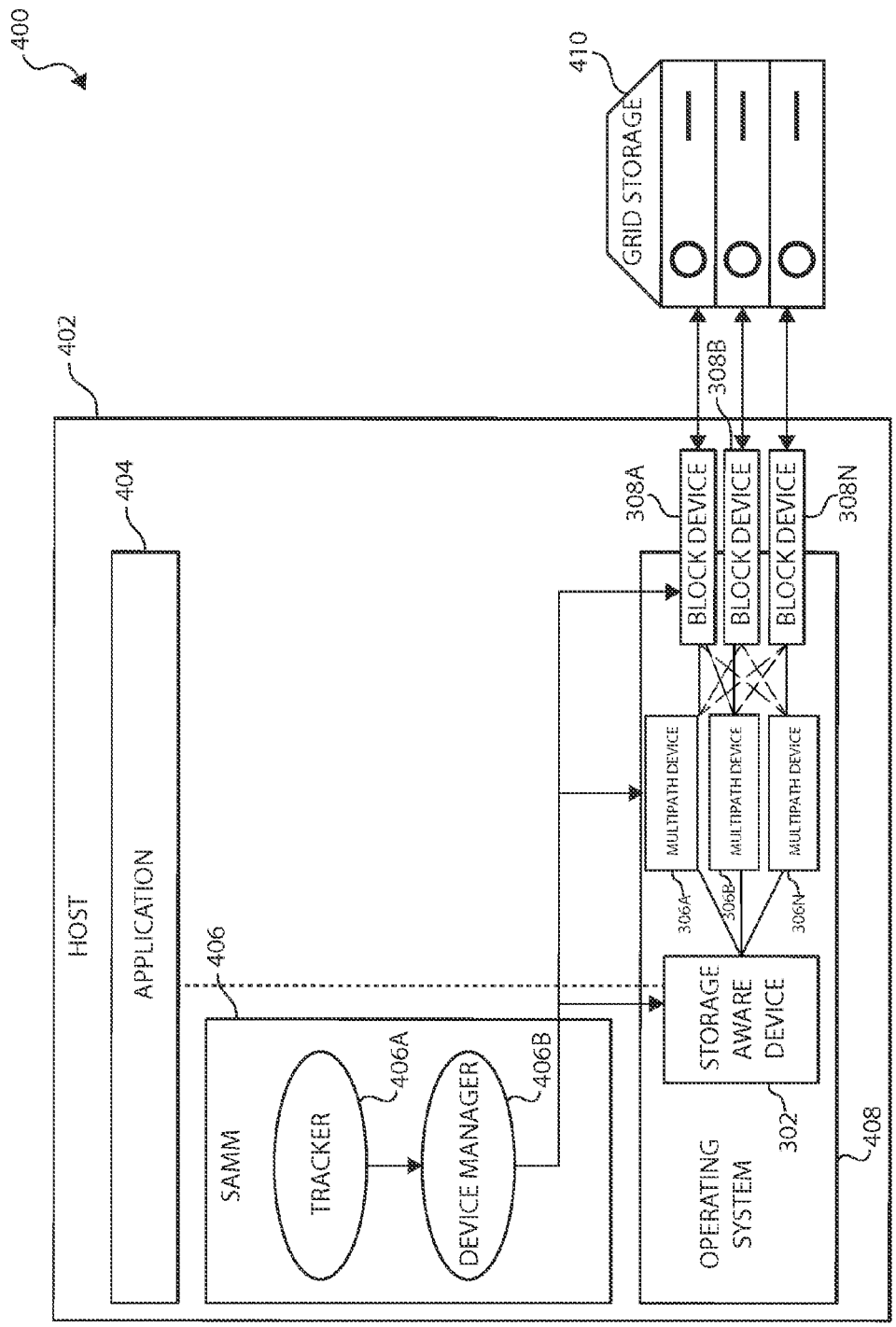
FIG. 4 illustrates further an additional block diagram of an additional exemplary hardware structure, here again, in which aspects of the present invention may be realized.

FIG. 4 is a block diagram of one embodiment illustrating the orientation of SAMM within the overall storage system 400. Shown is a host 402 interconnected with grid storage 410. Host 402 consists of an application 404, an operating system 408, and SAMM 406 acting as middle ware. In another embodiment, the functionality of SAMM 406 may be implemented into the operating system 408 itself. SAMM 406 consists of a tracker 406a, and device manager 406b. Transacting between host 402 and grid storage 410 are the three previously mentioned device levels. Illustrated are storage-aware device 302, multipath devices 306a, 306b, 306n, and block storage devices 308a, 308b, 308n. Tracker 406a monitors and detects changes in grid storage 410, by continuously comparing current data path devices from all three levels of the data path to the current storage structure and its connectivity to the host. When tracker 406a detects a change within the storage structure, it triggers device manager 406b to create or edit the current devices as necessary.

Once triggered, device manager 406b scans the available devices and updates them to comply with the new structure of the grid storage 410. Device manager 406b integrates devices from all three levels of the data path and is responsible to load the data-block lookup table 304 holding the routing decisions to level three (storage aware device level) devices, without interfering with the transacting I/O operations.

Figure 5:
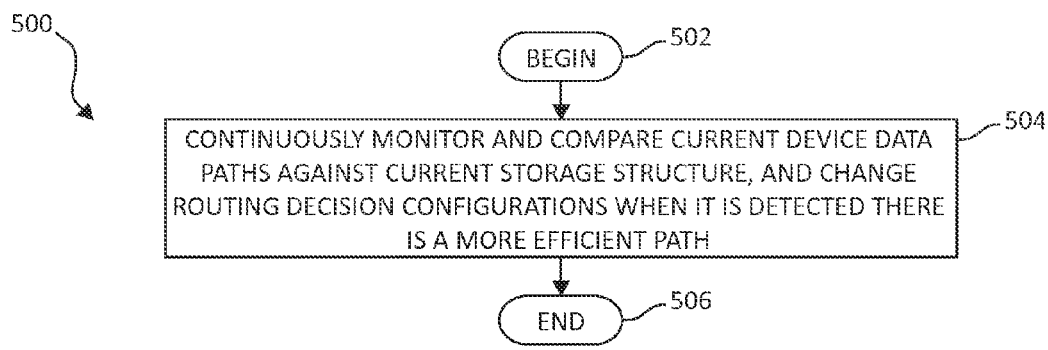
FIG. 5 illustrates a flow chart for a method of data multipath management in a grid-storage environment.

FIG. 5 illustrates a method 500, reviewing a method for data multipath management. In one embodiment, starting at 502, current device data paths are monitored and compared against the current storage structure, and data routing decisions configurations are updated and changed when it is detected there is a more efficient path (step 504). The method ends 506.

Figure 6:
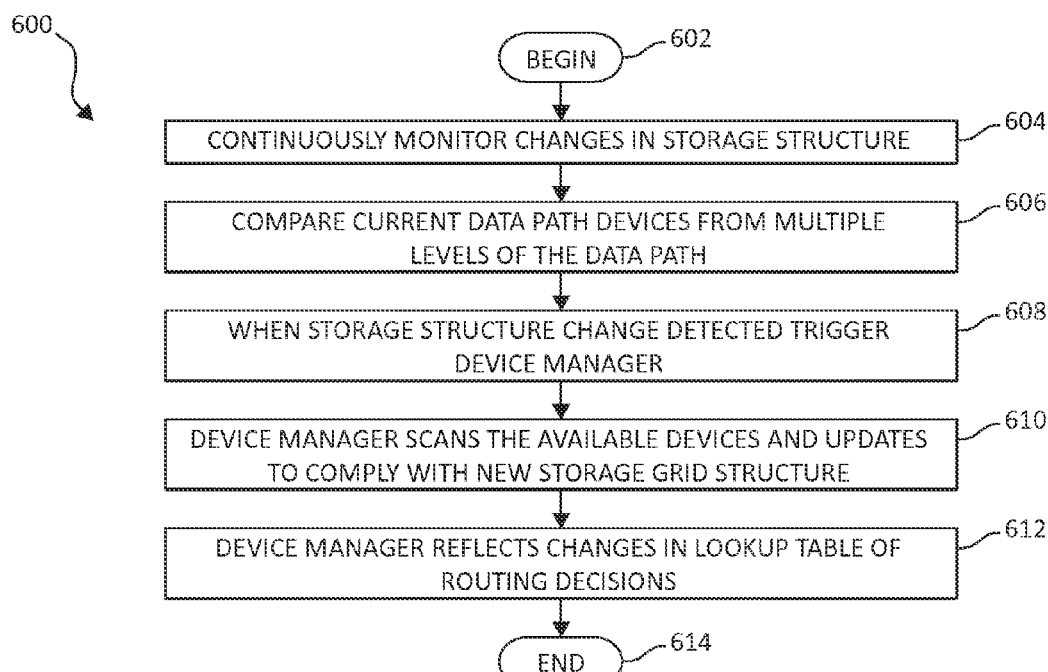
FIG. 6 illustrates an additional flow chart for a method of data multipath management in a grid-storage environment.

FIG. 6 illustrates a method 600, further reviewing a method for data multipath management. In one embodiment, starting at 602, changes within the current storage structure are continuously monitored (step 604). Tracker 406a compares the current data path devices to multiple levels of the device data paths (step 606). When a change within the storage structure is detected, device manager 406b is triggered (step 608). Device manager 406b scans the available devices and updates them to comply with the new storage grid 410 structure (step 610). Device manager 406b reflects these changes in the data-block lookup table 304, which maintains and influences routing decisions (step 612). The method ends 614.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for multipath management in a storage grid, by a processor device, comprising:
   in a software-defined storage (SDS) array, continuously monitoring and comparing data transacting between current data path devices from multiple levels of the data path against a current storage structure by using a multi-path management system acting as middleware between an application and an operating system of a host, and
   changing routing decision configurations between the host and a grid node when it is detected there is a more efficient data path such that as the storage grid is scaled-out by adding additional grid nodes to the SDS array, information regarding modifications in the current storage structure associated with the adding of the additional grid nodes is transmitted to the multi-path management system comprising a multi-path driver to compute the more efficient data path between the host and the grid node; wherein the multiple levels are at least a block device level comprising block devices of each possible physical path in which to transact the data, a multipath device level having multiple multi-path devices each comprising a plurality of aggregated physical paths, and a storage-aware device level comprising an aggregated plurality of the multipath devices.

2. The method of claim 1, further including triggering a device manager when a change in the storage structure is detected.

3. The method of claim 2, further including scanning, by the device manager, available devices, and updating the devices to comply with the current storage structure.

4. The method of claim 2, wherein the device manager is responsible to load a lookup table of data path routing decisions.

5. The method of claim 1, wherein the more efficient data path is the shortest data path.

6. A system for multipath management in a storage grid, comprising:
   a processor device, wherein the processor device:
      in a software-defined storage (SDS) array, continuously monitors and compares data transacting between current data path devices from multiple levels of the data path against a current storage structure by using a multi-path management system acting as middleware between an application and an operating system of a host, and
      changes routing decision configurations between the host and a grid node when it is detected there is a more efficient data path such that as the storage grid is scaled-out by adding additional grid nodes to the SDS array, information regarding modifications in the current storage structure associated with the adding of the additional grid nodes is transmitted to the multi-path management system comprising a multi-path driver to compute the more efficient data path between the host and the grid node; wherein the multiple levels are at least a block device level comprising block devices of each possible physical path in which to transact the data, a multipath device level having multiple multipath devices each comprising a plurality of aggregated physical paths, and a storage-aware device level comprising an aggregated plurality of the multipath devices.

7. The system of claim 6, wherein the processor device triggers a device manager when a change in the storage structure is detected.

8. The system of claim 7, wherein the processor device scans, by the device manager, available devices, and updates the devices to comply with the current storage structure.

9. The system of claim 7, wherein the device manager is responsible to load a lookup table of data path routing decisions.

10. The system of claim 6, wherein the more efficient data path is the shortest data path.

11. A computer program product for multipath management in a storage grid, by a processor device, the computer program product comprising a non-transitory computer-readable storage medium having computer-readable program code portions stored therein, the computer-readable program code portions comprising:
a first executable portion that, in a software-defined storage (SDS) array, continuously monitors and compares data transacting between current data path devices from multiple levels of the data path against a current storage structure by using a multi-path management system acting as middleware between an application and an operating system of a host, and
changes routing decision configurations between the host and a grid node when it is detected there is a more efficient data path such that as the storage grid is scaled-out by adding additional grid nodes to the SDS array, information regarding modifications in the current storage structure associated with the adding of the additional grid nodes is transmitted to the multi-path management system comprising a multi-path driver to compute the more efficient data path between the host and the grid node; wherein the multiple levels are at least a block device level comprising block devices of each possible physical path in which to transact the data, a multipath device level having multiple multi-path devices each comprising a plurality of aggregated physical paths, and a storage-aware device level comprising an aggregated plurality of the multipath devices.

12. The computer program product of claim 11, further including a second executable portion that triggers a device manager when a change in the storage structure is detected.

13. The computer program product of claim 12, further including a third executable portion that scans, by the device manager, available devices, and updates the devices to comply with the current storage structure.

14. The computer program product of claim 12, wherein the device manager is responsible to load a lookup table of data path routing decisions.

15. The computer program product of claim 11, wherein the more efficient data path is the shortest data path.

* * * * *